(12) United States Patent
Xiao et al.

(10) Patent No.: US 12,107,677 B2
(45) Date of Patent: Oct. 1, 2024

(54) RATE MATCHING METHOD, DEVICE AND STORAGE MEDIUM

(71) Applicant: ZTE CORPORATION, Shenzhen (CN)

(72) Inventors: Huahua Xiao, Shenzhen (CN); Chuangxin Jiang, Shenzhen (CN); Shujuan Zhang, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 59 days.

(21) Appl. No.: 17/599,424

(22) PCT Filed: Mar. 25, 2020

(86) PCT No.: PCT/CN2020/081057
§ 371 (c)(1),
(2) Date: Sep. 28, 2021

(87) PCT Pub. No.: WO2020/200001
PCT Pub. Date: Oct. 8, 2020

(65) Prior Publication Data
US 2022/0190951 A1    Jun. 16, 2022

(30) Foreign Application Priority Data
Mar. 29, 2019  (CN) .......................... 201910260530.2

(51) Int. Cl.
*H04L 1/00*  (2006.01)
*H04W 72/23*  (2023.01)

(52) U.S. Cl.
CPC .......... *H04L 1/0013* (2013.01); *H04W 72/23* (2023.01)

(58) Field of Classification Search
CPC .............................. H04L 1/0013; H04W 72/23
See application file for complete search history.

(56) References Cited

U.S. PATENT DOCUMENTS

| 8,902,842 B1 | 12/2014 | Gomadam et al. |
| 2011/0143796 A1* | 6/2011 | Lee ........................ H04L 5/0055 455/507 |

(Continued)

FOREIGN PATENT DOCUMENTS

| CN | 103491637 A | 1/2014 |
| CN | 103634074 A | 3/2014 |

(Continued)

OTHER PUBLICATIONS

International Search Report for Application No. PCT/CN2020/081057, dated Jun. 30, 2020, 4 pages including translation.

(Continued)

*Primary Examiner* — Won Tae C Kim
(74) *Attorney, Agent, or Firm* — Morgan, Lewis & Bockius LLP

(57) ABSTRACT

Provided are a rate matching method and apparatus and a storage medium. The method includes the step described below. N groups of rate matching parameters are configured, where the N groups of rate matching parameters are used for indicating rate matching resources corresponding to N groups of physical channels, and N is an integer greater than 1.

16 Claims, 3 Drawing Sheets

---

Configure N groups of rate matching parameters, where the N groups of rate matching parameters are used for indicating rate matching resources corresponding to N groups of physical channels, and N is an integer greater than 1  — S110

Send the N groups of rate matching parameters through higher layer signaling and/or physical layer signaling — S120

(56) References Cited

U.S. PATENT DOCUMENTS

| | | | |
|---|---|---|---|
| 2014/0321370 A1 | 10/2014 | Chen et al. | |
| 2016/0094374 A1 | 3/2016 | Koorapaty et al. | |
| 2018/0199363 A1 | 7/2018 | Lee et al. | |
| 2018/0316452 A1* | 11/2018 | Chen | H04B 7/0413 |
| 2019/0045490 A1 | 2/2019 | Davydov et al. | |
| 2020/0100225 A1* | 3/2020 | Khoshnevisan | H04W 72/51 |
| 2020/0178272 A1* | 6/2020 | Khoshnevisan | H04L 5/0094 |
| 2020/0267748 A1* | 8/2020 | Khoshnevisan | H04B 7/0689 |
| 2021/0320821 A1* | 10/2021 | Lee | H04W 56/00 |
| 2021/0344442 A1* | 11/2021 | Jiang | H04L 5/0048 |
| 2022/0046701 A1* | 2/2022 | Lei | H04W 74/0808 |
| 2022/0150011 A1* | 5/2022 | Kim | H04L 5/0048 |
| 2022/0167367 A1* | 5/2022 | Tidestav | H04W 72/1263 |

FOREIGN PATENT DOCUMENTS

| | | |
|---|---|---|
| CN | 104488217 A | 4/2015 |
| CN | 104756435 A | 7/2015 |
| CN | 107431963 A | 12/2017 |
| CN | 108024375 A | 5/2018 |
| CN | 109155926 A | 1/2019 |
| CN | 110535604 A | 12/2019 |
| WO | WO-2019003156 A1 | 1/2019 |
| WO | WO-2020/034561 A1 | 2/2020 |
| WO | WO-2020/144626 A1 | 7/2020 |

OTHER PUBLICATIONS

Mediatek Inc., "Multi-TRP and Multi-panel transmission", *3GPP TSG RAN WG1 Meeting #88bis R1-1707837*, May 19, 2017 (May 19, 2017), entire document.

Chinese Office Action for Application No. 201910260530.2, dated Dec. 28, 2022, 14 pages including translation.

Chinese Search Report for Application No. 201910260530.2, dated Dec. 17, 2022, 6 pages including translation.

Huawei et al., "Summary of AI: 7.2.8.2 Enhancements on Multi-TRP/Panel Transmission of Offline Discussion", 3GPP TSG RAN WG1 Meeting #96, R1-1903541, Athens, Greece, Feb. 25-Mar. 1, 2019, 59 pages.

Extended European Search Report for Application No. 20782344.4, dated Jun. 7, 2023, 16 pages.

Huawei et al., "Enhancements on Multi-TRP/panel transmission", 3GPP TSG RAN WG1 Meeting #96, R1-1901567, Athens, Greece, Feb. 25-Mar. 1, 2019, 14 pages.

Vivo, "Discussion on multi PDCCH based multi TRP transmission", 3GPP TSG RAN WG1 Ad-Hoc Meeting 1901, R1-1900137, Taipei, Jan. 21-25, 2019, 15 pages.

Panasonic, "TP on rate matching Subclause 5.1.4 in TS38.214", 3GPP TSG RAN WG1#94, R1-1808871, Gothenburg, Sweden, Aug. 20-24, 2018, 3 pages.

Search Report for Chinese Application No. 201910260530.2, dated Sep. 25, 2023, 8 pages including English translation.

Office Action for Chinese Application No. 201910260530.2, dated Sep. 25, 2023, 26 pages including English translation.

ZTE Corp et al., "Introduction of cell level rate match parameters in serving Cell Config", 3GPP TSG RAN WG2 Meeting #103bis, R2-1813942, Chengdu, China, Oct. 8-12, 2018, 9 pages.

ETRI, "Remaining issues on DL preemption indication", 3GPP TSG RAN WG1 Meeting #91, R1-1720229, Reno, USA, Nov. 27-Dec. 1, 2017, 7 pages.

\* cited by examiner

RATE MATCHING METHOD, DEVICE AND STORAGE MEDIUM

CROSS-REFERENCE TO RELATED APPLICATIONS

This is a National Stage Application filed under 35 U.S.C. 371 based on International Patent Application No. PCT/CN2020/081057, filed on Mar. 25, 2020, which claims priority to Chinese Patent Application No. 201910260530.2 filed on Mar. 29, 2019, the disclosure disclosures of both of which are incorporated herein by reference in their entireties.

TECHNICAL FIELD

The present disclosure relates to the field of wireless communication networks, for example, to a rate matching method and apparatus and a storage medium.

BACKGROUND

For whether long term evolution (LTE) and LTE-Advanced (LTE-A) of the 4th generation or new radio (NR) access technology of the 5th generation, joint transmission performed by multi-transmission receive point (multi-TRP) or multi-Panel to the same user equipment (UE) is a popular technology to improve system performance. However, there is no detailed discussion on the rate matching of joint transmission performed by multi-TRP or multi-panel to the same UE.

SUMMARY

The present disclosure provides a rate matching method, apparatus and a storage medium, which can solve the problem of rate matching when multi-TRP or multi-Panel performs joint transmission to the same terminal.

An embodiment of the present disclosure provides a rate matching method. The method includes steps described below. N groups of rate matching parameters are configured, where the N groups of rate matching parameters are used for indicating rate matching resources corresponding to N groups of physical channels, and N is an integer greater than 1.

An embodiment of the present disclosure provides a rate matching method. The method includes steps described below. N groups of rate matching parameters are received, where the N groups of rate matching parameters are used for indicating rate matching resources corresponding to N groups of physical channels, and N is an integer greater than 1.

An embodiment of the present disclosure provides a rate matching apparatus. The apparatus includes a parameter configuration module. The parameter configuration module is configured to configure N groups of rate matching parameters, where the N groups of rate matching parameters are used for indicating rate matching resources corresponding to N groups of physical channels, and N is an integer greater than 1.

An embodiment of the present disclosure provides a rate matching apparatus. The apparatus includes a reception module. The reception module is configured to receive N groups of rate matching parameters, where the N groups of rate matching parameters are used for indicating rate matching resources corresponding to N groups of physical channels, and N is an integer greater than 1.

An embodiment of the present disclosure provides a computer-readable storage medium. The storage medium is configured to store computer programs which, when executed by a processor, implement the method of any one of the above embodiments.

More description of the preceding embodiments and other aspects of the present disclosure and the implementations thereof is provided in the BRIEF DESCRIPTION OF DRAWINGS, DETAILED DESCRIPTION, and claims.

DETAILED DESCRIPTION

Figure 1:
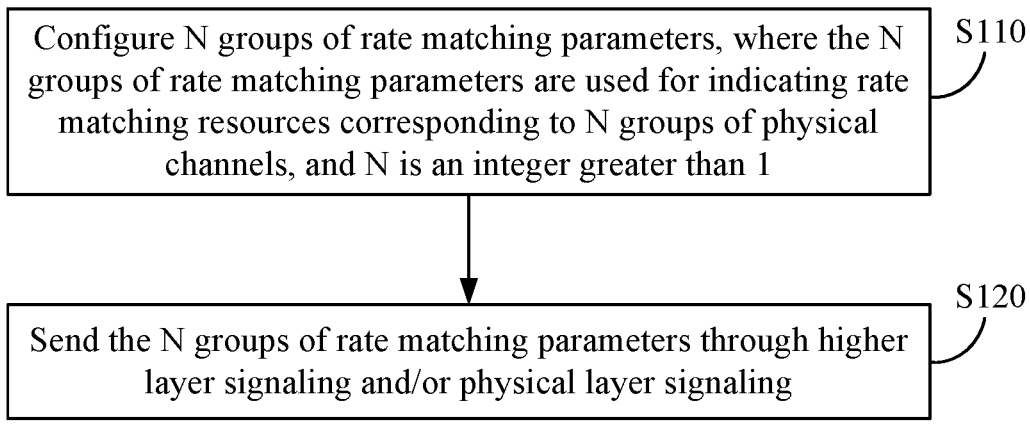
FIG. 1 is a flowchart of a rate matching method according to an embodiment.

Embodiments of the present disclosure are described below in conjunction with the drawings.

With the development of wireless technologies, joint transmission performed by multi-transmission receive point (multi-TRP) or multi-Panel to the same user equipment (UE) becomes a popular technology that can improve system performance. However, no detailed discussion on the joint transmission performed by multi-TRP or multi-panel to the same UE exists, so that the rate matching of physical downlink shared channels (PDSCHs) or the rate matching of physical downlink control channels (PDCCHs) in the scene of multi-TRP or multi-Panel is not well done. Exemplarily, in a non-backhaul multi-TRP transmission scene, the PDSCH transmitted by each TRP is scheduled based on an independent PDCCH, and the current protocol cannot well support the rate matching of this scene.

The embodiments of the present disclosure provide a mobile communication network (which includes, but is not limited to, a 5th-generation (5G) mobile communication network). The network architecture of this network may include network side devices (such as one or more types of base stations, transmission nodes, and relays) and terminals (such as users, user equipment data cards and mobile devices). In the embodiments of the present disclosure, a rate matching method and apparatus and a computer-readable storage medium that can run on the above network architecture are provided, which can solve the problem of rate matching when multi-TRP or multi-Panel performs joint transmission to the same terminal. The operating environment of the above rate matching method provided in the embodiments of the present disclosure is not limited to the above network architecture.

For ease of understanding, some concepts or technical terms are first described herein.

A rate match pattern list rateMatchPatternToAddModList saves at least one rate match pattern indicator RateMatch- PatternId. Each RateMatchPatternId corresponds to a specific value of one rate match pattern RateMatchPattern and is used for indicating a rate matching resource corresponding to a physical channel.

A rate match pattern group 1 rateMatchPatternGroup1 saves at least one UE-specific or cell-specific or bandwidth part (BWP)-specific RateMatchPatternId and is used for dynamic signaling to indicate a rate matching resource corresponding to a physical channel. The UE-specific RateMatchPatternId may take value from the rateMatchPatternToAddModList, and the cell-specific or BWP-specific RateMatchPatternId may take value from the rateMatchPatternToAddModList in a serving cell common configuration parameter ServingCellConfigCommon.

A rate match pattern group 2 rateMatchPatternGroup2 saves at least one UE-specific or cell-specific or BWP-specific RateMatchPatternId and is used for dynamic signaling to indicate a rate matching resource corresponding to a physical channel. The UE-specific RateMatchPatternId may take value from the rateMatchPatternToAddModList, and the cell-specific or BWP-specific RateMatchPatternId may take value from the rateMatchPatternToAddModList in the ServingCellConfigCommon.

The physical channel herein includes at least one of: the PDCCH or the PDSCH.

A base station dynamically selects the rateMatchPatternGroup1 and/or the rateMatchPatternGroup2 through dynamic signaling (a rate matching indicator). When the rateMatchPatternGroup1 is selected, a time-frequency resource indicated by the rateMatchPatternGroup1 is not used for transmitting the PDSCH or the PDCCH; when the rateMatchPatternGroup2 is selected, a time-frequency resource indicated by the rateMatchPatternGroup2 is not used for transmitting the PDSCH or the PDCCH; in the RateMatchPattern indicated by the rateMatchPatternToAddModList configured by higher layer signaling, regions indicated by patterns other than the rateMatchPatternGroup1 and the rateMatchPatternGroup2 are not used for transmitting the PDCCH or the PDSCH.

A zero power channel-state information reference signal (ZP CSI-RS) may also be referred to as a zero power channel-state information reference pilot. In time domain, the ZP CSI-RS includes a periodic type, a semi-persistent type and an aperiodic type, that is, a periodic ZP CSI-RS, a semi-persistent ZP CSI-RS and an aperiodic ZP CSI-RS exist. Time-frequency resources configured with the periodic ZP CSI-RS, the semi-persistent ZP CSI-RS and the aperiodic ZP CSI-RS also need to be performed with rate matching and are not used for transmitting the PDSCH or the PDCCH.

A non zero power channel-state information reference signal (NZP CSI-RS) may also be referred to as a non zero power channel-state information reference pilot. In time domain, the NZP CSI-RS includes a periodic type, a semi-persistent type and an aperiodic type, that is, a periodic NZP CSI-RS, a semi-persistent NZP CSI-RS and an aperiodic NZP CSI-RS exist. Time-frequency resources configured with the periodic NZP CSI-RS and the semi-persistent NZP CSI-RS also need to be performed with rate matching and are not used for transmitting the PDSCH or the PDCCH.

In addition, the reference pilot and the reference signal mentioned in the present disclosure can be interchanged or replaced with each other.

A synchronisation signal block (SSB) is configured to transmit synchronization signals, or when a physical broadcast channel (PBCH), the PDSCH or the PDCCH perform rate matching, the time-frequency resource corresponding to the SSB is also performed with rate matching.

Downlink preemption DownlinkPreemption is configured by a base station through downlink control information to indicate that some resource blocks of some slots or symbols are not used for transmitting the PDSCH or the PDCCH.

A long term evolution common reference signal match resource lte-CRS-ToMatchAround is configured to notify resources where common reference signals of LTE are located that, particularly, the PDSCH or the PDCCH may need to perform rate matching on these resources.

A control resource set ControlResourceSet (CORESET) specifies some time-frequency resource blocks, and these time-frequency resource blocks are configured to transmit the PDCCH. For the time-frequency resource blocks corresponding to the CORESET, the PDSCH also needs to perform rate matching on the time-frequency resources.

In an embodiment, the value of a rate matching parameter in the embodiments described below of the present disclosure includes at least one of the cases described below.

In the case where the rate matching parameter is the rateMatchPatternToAddModList, the rateMatchPatternToAddModList takes value from the RateMatchPattern. The RateMatchPattern is used for indicating that if a time-frequency resource that needs to be performed with rate matching is configured, the time-frequency resource is not used for transmitting the PDCCH or the PDSCH.

In the case where the rate matching parameter is the rateMatchPatternGroup1, the rateMatchPatternGroup1 takes value from the RateMatchPatternID.

In the case where the rate matching parameter is the rateMatchPatternGroup2, the rateMatchPatternGroup2 takes value from the RateMatchPatternID.

In the case where the rate matching parameter is the periodic ZP CSI-RS, the periodic ZP CSI-RS takes value from a ZP CSI-RS resource Set.

In the case where the rate matching parameter is the semi-persistent ZP CSI-RS, the semi-persistent ZP CSI-RS takes value from the ZP CSI-RS resource Set.

In the case where the rate matching parameter is the aperiodic ZP CSI-RS, the aperiodic ZP CSI-RS takes value from the ZP CSI-RS resource Set.

In the case where the rate matching parameter is the periodic NZP CSI-RS, the periodic NZP CSI-RS takes value from an NZP CSI-RS resource Set, or a NZP CSI-RS resource or channel-state information reference signal resource configuration CSI-ResourceConfig (can also be written as CSI-RS resource setting).

In the case where the rate matching parameter is the semi-persistent NZP CSI-RS, the semi-persistent NZP CSI-RS takes value from the NZP CSI-RS resource Set, or the NZP CSI-RS resource, or the CSI-ResourceConfig (can also be written as CSI-RS resource setting) or channel-state information report configuration CSI reportconfig.

The NZP CSI-RS resource Set includes an NZP CSI-RS resource indicator list, an NZP CSI-RS resource Set indicator and a repetition identifier (repetition), and the CSI-ResourceConfig includes parameters such as a csi-ResourceConfigId, a CSI-RS resource Set indicator list, a resource type resourceType and a bwp-Id.

The rate matching method and apparatus and technical effects are described below.

In a system including N (N>1) network side devices (such as base stations or TRPs) and M (M≥1) terminals (such as UEs), N network side devices simultaneously serve one UE, which is referred to as joint transmission.

FIG. 1 is a flowchart of a rate matching method according to an embodiment. As shown in FIG. 1, the method provided by the embodiment is applicable to a sending terminal, and the sending terminal may be a network side device. The method includes steps described below.

In step S110, N groups of rate matching parameters are configured, where the N groups of rate matching parameters are used for indicating rate matching resources corresponding to N groups of physical channels, and N is an integer greater than 1.

The rate matching parameters include but are not limited to at least one of parameters described below.

At least one of a rateMatchPatternToAddModList, a rateMatchPatternGroup1, a rateMatchPatternGroup2, a periodic ZP CSI-RS, a semi-persistent ZP CSI-RS, an aperiodic ZP CSI-RS, a periodic NZP CSI-RS, a semi-persistent NZP CSI-RS, an SSB, downlinkPreemption, an lte-CRS-ToMatchAround or a control resource set list controlResourceSetToAddModList is included.

The above physical channels may be PDCCHs or PDSCHs.

In the case where the physical channels are PDSCHs, the N groups of rate matching parameters being used for indicating the rate matching resources corresponding to the N groups of physical channels refers to that the i-th group of rate matching parameters are used for indicating rate matching resources corresponding to PDSCHs scheduled by the i-th group of PDCCHs. That is, on time-frequency resources indicated by the i-th group of rate matching parameters, the PDSCHs are not transmitted. The i-th group of PDCCHs come from the i-th group of CORESETs, i=0, . . . , N−1, and N is an integer greater than 1.

In the case where the physical channels are PDCCHs, the N groups of rate matching parameters being used for indicating the rate matching resources corresponding to the N groups of physical channels refers to that the i-th group of rate matching parameters are used for indicating rate matching resources corresponding to the i-th group of PDCCHs. That is, on time-frequency resources indicated by the i-th group of rate matching parameters, the PDCCHs are not transmitted. The i-th group of PDCCHs come from the i-th group of CORESETs, i=0, . . . , N−1, and N is an integer greater than 1.

The i-th group of CORESETs mentioned herein corresponds to the i-th CORESET group and includes at least one CORESET; the i-th group of PDSCHs mentioned herein corresponds to the i-th PDSCH group and includes at least one PDSCH; the i-th group of PDCCHs mentioned herein corresponds to the i-th PDDCH group and includes at least one PDCCH; i=0, . . . , N−1, and N is an integer greater than 1.

In an embodiment, the i-th group of CORESETs are configured by the i-th network side device, and the i-th group of PDCCHs is from the i-th group of CORESETs and is transmitted by the i-th network side device; i=0, . . . , N−1, and N is an integer greater than 1.

The rate matching resources refer to the time-frequency resources not used for transmitting or receiving PDSCHs and/or PDCCHs, or the rate matching resources refer to the time-frequency resources not used for sending or demodulating PDSCHs and/or PDCCHs In an embodiment, the same group of rate matching parameters of the N groups of rate matching parameters include the same rate match group indicator RateMatchGroupID, the RateMatchGroupID is an integer greater than or equal to 0 and less than N, and N is an integer greater than 1. That is, for the i-th group of rate matching parameters, the RateMatchGroupID of the i-th group of rate matching parameters satisfies that RateMatchGroupID=i, i=0, . . . , N−1, and N is an integer greater than 1.

The RateMatchGroupID is a sub-parameter of any one of parameters described below, that is, the sub-parameter RateMatchGroupID is added to any one of the parameters: a RateMatchPattern, a ZP CSI-RS resource Set, an NZP CSI-RS resource Set, an NZP CSI-RS resource Set, an NZP CSI-RS resource, non zero power channel-state information reference signal resource set configuration (NZP CSI-RS resource Set config), CSI reportconfig, DownlinkPreemption, an LTE common reference signal rate match pattern RateMatchPatternLTE-CRS or a ControlResourceSet.

In an embodiment, a parameter related to the rate matching of at least one of following parameters is expanded into N shares, where the i-th share of parameter related to the rate matching corresponds to the i-th group of rate matching parameters, i=0, . . . , N−1, and N is an integer greater than 1: PDSCH configuration PDSCH-Config, PDCCH configuration PDCCH-Config, serving cell common configuration ServingCellConfigCommon or channel-state information measurement configuration CSI-MeasConfig.

Specifically, at least one of cases described below is included. In the PDSCH-Config, the rateMatchPatternToAddModList and/or a rateMatchPatternToReleaseList are expanded into N shares; in the ServingCellConfigCommon, the rateMatchPatternToAddModList and/or the rateMatchPatternToReleaseList are expanded into N shares; in the PDSCH-Config, the rateMatchPatternGroup1 and/or the rateMatchPatternGroup2 are expanded into N shares; in the PDSCH-Config, an aperiodic-ZP-CSI-RS-ResourceSets-ToAddModList and/or an aperiodic-ZP-CSI-RS-ResourceSetsToReleaseList are expanded into N shares; in the PDSCH-Config, an sp-ZP-CSI-RS-ResourceSetsToAddModList and/or an sp-ZP-CSI-RS-ResourceSetsToReleaseList are expanded into N shares; in the PDSCH-Config, a p-ZP-CSI-RS-ResourceSetsToAddModList and/or a p-ZP-CSI-RS-ResourceSetsToReleaseList are expanded into N shares; in the CSI-MeasConfig, an nzp-CSI-RS-ResourceToAddModList and/or an nzp-CSI-RS-ResourceToReleaseList are expanded into N shares; in the CSI-MeasConfig, an nzp-CSI-RS-ResourceSetToAddModList and/or an nzp-CSI-RS-ResourceSetToReleaseList are expanded into N shares; in the CSI-MeasConfig, a csi-ResourceConfigToAddModList and/or a csi-ResourceConfigToReleaseList are expanded into N shares; in the CSI-MeasConfig, a csi-ReportConfigToAddModList and/or a csi-ReportConfigToReleaseList are expanded into N shares; in the ServingCellConfigCommon, an ssb-PositionsInBurst is expanded into N shares; in the ServingCellConfigCommon, the lte-CRS-ToMatchAround is expanded into N shares; in the PDCCH-Config, the downlinkPreemption is expanded into N shares; or in the PDCCH-Config, the controlResourceSetToAddModList and/or a controlResourceSetToReleaseList are expanded into N shares.

In step S120, the N groups of rate matching parameters are sent through higher layer signaling and/or physical layer signaling.

In an embodiment, the step in which the N groups of rate matching parameters are sent through the higher layer signaling and/or the physical layer signaling may include: the N groups of rate matching parameters are semi-statically sent through the higher layer signaling; or, configured M groups of rate matching parameters are semi-statically sent through the higher layer signaling, and signaling used for selecting the N groups of rate matching parameters from the M groups of rate matching parameters is sent through the physical layer signaling; or, configured M groups of rate matching parameters are semi-statically sent through radio resource control (RRC) of the higher layer signaling, signaling for selecting N1 groups of rate matching parameters from the configured M groups of rate matching parameters is sent through another media access control control element (MAC CE), and signaling used for dynamically indicating the N groups of rate matching parameters selected by the MAC CE from the N1 groups of rate matching parameters is sent through the physical layer signaling; or the N groups of rate matching parameters are only sent by using the physical layer signaling. M≥N1≥N>1, and M, N1 and N are positive integers. In an embodiment, the N groups of rate matching parameters are sent through one piece of higher layer signaling and N pieces of physical layer signaling, and N is an integer greater than 1.

In the embodiment of the present disclosure, multiple groups of rate matching parameters are configured, so that when N network side devices simultaneously serve one UE, the N network side devices can use respective rate matching parameters to perform service transmission, and the problem of rate matching when multi-TRP or multi-Panel performs joint transmission to the same terminal is solved.

Figure 2:
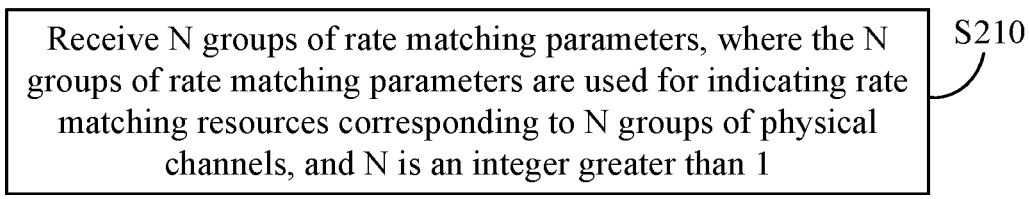
FIG. 2 is a flowchart of another rate matching method according to an embodiment.

FIG. 2 is a flowchart of another rate matching method according to an embodiment. As shown in FIG. 2, the method provided by the embodiment is applicable to a reception terminal, and the reception terminal may be a terminal. The method includes steps described below.

In step S210, N groups of rate matching parameters are received, where the N groups of rate matching parameters are used for indicating rate matching resources corresponding to N groups of physical channels, and N is an integer greater than 1.

The rate matching parameters include but are not limited to at least one of following parameters: a rateMatchPatternToAddModList, a rateMatchPatternGroup 1, a rateMatchPatternGroup2, a periodic ZP CSI-RS, a semi-persistent ZP CSI-RS, an aperiodic ZP CSI-RS, a periodic NZP CSI-RS, a semi-persistent NZP CSI-RS, an SSB, downlinkPreemption, an lte-CRS-ToMatchAround or a controlResourceSetToAddModList.

The above physical channels may be PDCCHs or PDSCHs.

In the case where the physical channels are PDSCHs, the N groups of rate matching parameters being used for indicating the rate matching resources corresponding to the N groups of physical channels refers to that the i-th group of rate matching parameters are used for indicating rate matching resources corresponding to PDSCHs scheduled by the i-th group of PDCCHs. That is, on time-frequency resources indicated by the i-th group of rate matching parameters, the PDSCHs are not received (or are not demodulated, or are ignored). The i-th group of PDCCHs is from the i-th group of CORESETs, i=0, . . . , N−1, and N is an integer greater than 1.

In the case where the physical channels are PDCCHs, the N groups of rate matching parameters being used for indicating the rate matching resources corresponding to the N groups of physical channels refers to that the i-th group of rate matching parameters are used for indicating rate matching resources corresponding to the i-th group of PDCCHs. That is, on time-frequency resources indicated by the i-th group of rate matching parameters, the PDCCHs are not received (or are not demodulated, or are ignored). The i-th group of PDCCHs come from the i-th group of CORESETs, i=0, . . . , N−1, and N is an integer greater than 1.

The i-th group of CORESETs mentioned herein corresponds to the i-th CORESET group and includes at least one CORESET; the i-th group of PDSCHs mentioned herein corresponds to the i-th PDSCH group and includes at least one PDSCH; the i-th group of PDCCHs mentioned herein corresponds to the i-th PDDCH group and includes at least one PDCCH; i=0, . . . , N−1, and N is an integer greater than 1.

In an embodiment, the i-th group of CORESETs are configured by the i-th network side device, and the i-th group of PDCCHs come from the i-th group of CORESETs and are received by the i-th network side device; i=0, . . . , N−1, and N is an integer greater than 1.

In an embodiment, the same group of rate matching parameters of the N groups of rate matching parameters include the same RateMatchGroupID, the RateMatchGroupID is an integer greater than or equal to 0 and less than N, and N is an integer greater than 1. That is, for the i-th group of rate matching parameters, the RateMatchGroupID of the i-th group of rate matching parameters satisfies that RateMatchGroupID=i, i=0, . . . , N−1, and N is an integer greater than 1.

The RateMatchGroupID is a sub-parameter of any one of following parameters, that is, the sub-parameter RateMatchGroupID is added to any one of the following parameters: a RateMatchPattern, a ZP CSI-RS resource Set, an NZP CSI-RS resource Set, an NZP CSI-RS resource Set, an NZP CSI-RS resource, NZP CSI-RS resource Set config, CSI reportconfig, DownlinkPreemption, a RateMatchPatternLTE-CRS or a ControlResourceSet.

In an embodiment, a parameter related to the rate matching of at least one of following parameters is expanded into N shares, where the i-th share of parameter related to the rate matching corresponds to the i-th group of rate matching parameters, i=0, . . . , N−1, and N is an integer greater than 1: PDSCH-Config, PDCCH-Config, ServingCellConfigCommon or CSI-MeasConfig.

In an embodiment, at least one of the following cases is included: in the PDSCH-Config, the rateMatchPatternToAddModList and/or a rateMatchPatternToReleaseList are expanded into N shares; in the ServingCellConfigCommon, the rateMatchPatternToAddModList and/or the rateMatchPatternToReleaseList are expanded into N shares; in the PDSCH-Config, the rateMatchPatternGroup1 and/or the rateMatchPatternGroup2 are expanded into N shares; in the PDSCH-Config, an aperiodic-ZP-CSI-RS-ResourceSetsToAddModList and/or an aperiodic-ZP-CSI-RS-ResourceSetsToReleaseList are expanded into N shares; in the PDSCH-Config, an sp-ZP-CSI-RS-ResourceSetsToAddModList and/or an sp-ZP-CSI-RS-ResourceSetsToReleaseList are expanded into N shares; in the PDSCH-Config, a p-ZP-CSI-RS-ResourceSetsToAddModList and/or a p-ZP-CSI-RS-ResourceSetsToReleaseList are expanded into N shares; in the CSI-MeasConfig, an nzp-CSI-RS-ResourceToAddModList and/or an nzp-CSI-RS-ResourceToReleaseList are expanded into N shares; in the CSI-MeasConfig, an nzp-CSI-RS-ResourceSetToAddModList and/or an nzp-CSI-RS-ResourceSetToReleaseList are expanded into N shares; in the CSI-MeasConfig, a csi-ResourceConfigToAddModList and/or a csi-ResourceConfigToReleaseList are expanded into N shares; in the CSI-MeasConfig, a csi-ReportConfigToAddModList and/or a csi-ReportConfigToReleaseList are expanded into N shares; in the ServingCellConfigCommon, an ssb-PositionsInBurst is expanded into N shares; in the ServingCellConfigCommon, the lte-CRS-ToMatchAround is expanded into N shares; in the PDCCH-Config, the downlinkPreemption is expanded into N shares; or in the PDCCH-Config, the controlResourceSetToAddModList and/or a controlResourceSetToReleaseList are expanded into N shares.

In an embodiment, in response to the rate matching parameters including an lte-CRS-ToMatchAround, if a resource element (RE) of the i-th group of PDCCHs is the same as an RE corresponding to a time-frequency resource indicated by an lte-CRS-ToMatchAround of the i-th group of rate matching parameters, the i-th group of PDCCHs are not received or are ignored; or in response to an RE of the i-th group of PDCCHs being the same as an RE corresponding to a time-frequency resource indicated by an lte-CRS-ToMatchAround of any group of rate matching parameters, the i-th group of PDCCHs are not received or are ignored; the i-th group of PDCCHs is from the i-th group of CORESETs, i=0, . . . , N−1, and N is an integer greater than 1.

In an embodiment, receiving the N groups of rate matching parameters may include: the N groups of rate matching parameters are received through higher layer signaling and/or physical layer signaling.

In an embodiment, the step in which the N groups of rate matching parameters are received through the higher layer signaling and/or the physical layer signaling may include: the N groups of rate matching parameters are semi-statically received through the higher layer signaling; or, configured M groups of rate matching parameters are semi-statically received through the higher layer signaling, and signaling used for selecting the N groups of rate matching parameters from the M groups of rate matching parameters is received through the physical layer signaling; or, configured M groups of rate matching parameters are semi-statically received through radio resource control (RRC) of the higher layer signaling, signaling for selecting N1 groups of rate matching parameters from the configured M groups of rate matching parameters is received through another Media Access Control control element (MAC CE), and signaling used for dynamically indicating the N groups of rate matching parameters selected by the MAC CE from the N1 groups of rate matching parameters is received through the physical layer signaling; or the N groups of rate matching parameters are only received by using the physical layer signaling. M≥N1≥N>1, and M, N1 and N are positive integers. In an embodiment, the N groups of rate matching parameters are received through one piece of higher layer signaling and N pieces of physical layer signaling, and N is an integer greater than 1.

Some exemplary implementations are listed below to illustrate the method for adding a RateMatchGroupID in the grouping of the rate matching parameters and the definition of the rate matching parameters, or expanding into N rate matching parameters or parameter groups.

The first exemplary implementation is used for illustrating higher layer signaling configuration of the rate matching parameters or the grouping and values of the rate matching parameters in the case where the rate matching parameter is the rateMatchPatternToAddModList.

In the related art, the higher layer signaling only configures one group of rate matching parameters, which is not good for the support for rate matching by multiple network side devices in the case of non ideal-backhual. In the solution of the present disclosure, the parameter related to the rate matching is increased to N shares, and each share of parameter corresponds to one rate matching parameter group and the N share of parameter are used for indicating that physical channels corresponding to N network side devices perform rate matching.

For example, in the PDSCH-Config, the rateMatchPatternToAddModList and/or the rateMatchPatternToReleaseList are expanded into N shares respectively corresponding to N rate matching parameter groups as follows:

```
PDSCH-Config ::=          SEQUENCE {
    ...
    rateMatchPatternToAddModList0       SEQUENCE (SIZE (1..maxNrofRateMatchPatterns)) OF
            RateMatchPattern                OPTIONAL,  -- Need N
    rateMatchPatternToReleaseList0      SEQUENCE (SIZE (1..maxNrofRateMatchPatterns)) OF
            RateMatchPatternId              OPTIONAL,
    rateMatchPatternToAddModList1       SEQUENCE (SIZE (1..maxNrofRateMatchPatterns)) OF
            RateMatchPattern                OPTIONAL,  -- Need N
    rateMatchPatternToReleaseList1      SEQUENCE (SIZE (1..maxNrofRateMatchPatterns)) OF
            RateMatchPatternId              OPTIONAL,
    ...
    rateMatchPatternToAddModList N-1    SEQUENCE (SIZE (1..maxNrofRateMatchPatterns)) OF
            RateMatchPattern                OPTIONAL,  -- Need N
    rateMatchPatternToReleaseListN-1    SEQUENCE (SIZE (1..maxNrofRateMatchPatterns)) OF
            RateMatchPatternId              OPTIONAL,
    ...
}.
```

In an embodiment, in the ServingCellConfigCommon, the rateMatchPatternToAddModList and the rateMatchPatternToReleaseList are expanded into N shares respectively corresponding to N rate matching parameter groups as follows:

```
ServingCellConfigCommon ::=     SEQUENCE {
    ...
    rateMatchPatternToAddModList0       SEQUENCE (SIZE (1..maxNrofRateMatchPatterns)) OF
            RateMatchPattern                OPTIONAL,  -- Need N
    rateMatchPatternToReleaseList0      SEQUENCE (SIZE (1..maxNrofRateMatchPatterns)) OF
            RateMatchPatternId              OPTIONAL,
    rateMatchPatternToAddModList1       SEQUENCE (SIZE (1..maxNrofRateMatchPatterns)) OF
            RateMatchPattern                OPTIONAL,  -- Need N
```

-continued

```
    rateMatchPatternToReleaseList1     SEQUENCE (SIZE (1..maxNrofRateMatchPatterns)) OF
           RateMatchPatternId              OPTIONAL,
    ...
    rateMatchPatternToAddModList N-1   SEQUENCE (SIZE (1..maxNrofRateMatchPatterns)) OF
           RateMatchPattern                OPTIONAL,   -- Need N
    rateMatchPatternToReleaseListN-1   SEQUENCE (SIZE (1..maxNrofRateMatchPatterns)) OF
           RateMatchPatternId              OPTIONAL,
    ...
}.
```

In this way, the i-th group of rate matching parameters corresponds to rateMatchPatternToAddModList i and/or rateMatchPatternToReleaseList i, i=0, . . . , N−1, and N is an integer greater than 1.

In an embodiment, in the related art, a sub-parameter, that is, a RateMatchGroupID, is added to the RateMatchPattern as follows. The value of the RateMatchGroupID is an integer greater than or equal to 0 and less than N, and N is an integer greater than 1.

```
    RateMatchPattern ::=       SEQUENCE {
        rateMatchPatternId         RateMatchPatternId,
        RateMatchGroupID           INTEGER (0...N-1)
        ...
    }.
```

That is, the RateMatchGroupID of the rateMatchPatternToAddModList i and/or the rateMatchPatternToReleaseList i corresponding to the i-th group of rate matching parameters satisfies that RateMatchGroupID=i, i=0, . . . , N−1, and N is an integer greater than 1. In this way, different rate matching parameter groups can be distinguished according to RateMatchGroupIDs.

The second exemplary implementation is used for illustrating higher layer signaling configuration of the rate matching parameters or the grouping and values of the rate matching parameters in the case where the rate matching parameter is the rateMatchPatternGroup1.

In the related art, the higher layer signaling only configures one group of rate matching parameters, which is not good for the support for rate matching by multiple network side devices in the case of non ideal-backhual. In the solution of the present disclosure, the parameter related to the rate matching is increased to N shares, and each share of parameter corresponds to one rate matching parameter group and the N shares of parameter are used for indicating that physical channels corresponding to N network side devices perform rate matching.

For example, in the PDSCH-Config, the rateMatchPatternGroup1 is expanded into N shares respectively corresponding to N rate matching parameter groups as follows:

```
PDSCH-Config ::=                SEQUENCE {
    ...
    rateMatchPatternGroup10    RateMatchPatternGroup    OPTIONAL,   -- Need R
    rateMatchPatternGroup11    RateMatchPatternGroup    OPTIONAL,   -- Need R
    ...
    rateMatchPatternGroup1N-1  RateMatchPatternGroup    OPTIONAL,   -- Need R
    ...
}.
```

In this way, rateMatchPatternGroup1 i corresponds to the parameter of the i-th group of rateMatchPatternGroup1, i=0, . . . , N−1, and N is an integer greater than 1. In an embodiment, a RateMatchPatternGroup includes a RateMatchPatternId array used for saving RateMatchPattern indicators.

```
RateMatchPatternGroup ::=  SEQUENCE (SIZE
                                (1..maxNrofRateMatchPatternsPerGroup)) OF
    CHOICE {
        cellLevel              RateMatchPatternId,
        bwpLevel               RateMatchPatternId
    }.
```

In an embodiment, in the related are, a sub-parameter, that is, a RateMatchGroupID, is added to the RateMatchPattern as follows. The value of the RateMatchGroupID is an integer greater than or equal to 0 and less than N, and N is an integer greater than 1.

```
    RateMatchPattern ::=       SEQUENCE {
        rateMatchPatternId         RateMatchPatternId,
        RateMatchGroupID           INTEGER (0...N-1)
        ...
    }.
```

Correspondingly, the RateMatchPattern corresponding to the RateMatchPatternGroup also has the sub-parameter RateMatchGroupID.

In an embodiment, for the rateMatchPatternGroup2, similar to the rateMatchPatternGroup1, in the PDSCH-Config, the rateMatchPatternGroup2 is expanded into N shares respectively corresponding to N rate matching parameter groups as follows:

```
PDSCH-Config ::=                        SEQUENCE {
  ...
    rateMatchPatternGroup20    RateMatchPatternGroup    OPTIONAL,    -- Need R
    rateMatchPatternGroup21    RateMatchPatternGroup    OPTIONAL,    -- Need R
    ....
    rateMatchPatternGroup2N-1  RateMatchPatternGroup    OPTIONAL,    -- Need R
  ...
}.
```

In this way, rateMatchPatternGroup2 i corresponds to the parameter of the i-th group of rateMatchPatternGroup2, i=0, . . . , N−1, and N is an integer greater than 1.

The third exemplary implementation is used for illustrating higher layer signaling configuration of the rate matching parameters or the grouping and values of the rate matching parameters in the case where the rate matching parameter is the ZP CSI-RS (including at least one of the periodic ZP CSI-RS, the semi-persistent ZP CSI-RS or the aperiodic ZP CSI-RS).

In order that the rate matching of the joint transmission of N network side devices to the same terminal is better supported, the parameter related to the rate matching is increased to N shares, and each share of parameter corresponds to one rate matching parameter group and the N shares of parameter are used for indicating that physical channels corresponding to the N network side devices perform rate matching.

For example, in the case where the rate matching parameter is the aperiodic ZP CSI-RS, in the PDSCH-Config, the aperiodic-ZP-CSI-RS-ResourceSetsToAddModList and the aperiodic-ZP-CSI-RS-ResourceSetsToReleaseList are expanded into N shares respectively corresponding to N rate matching parameter groups as follows:

```
PDSCH-Config ::=                        SEQUENCE {
  ...
    aperiodic-ZP-CSI-RS-ResourceSetsToAddModList0    SEQUENCE (SIZE
                                                     (1..maxNrofZP-CSI-RS-ResourceSets)) OF
                                                     ZP-CSI-RS-ResourceSet
                                                     OPTIONAL,   -- Need N
    aperiodic-ZP-CSI-RS-ResourceSetsToReleaseList0   SEQUENCE (SIZE
                                                     (1..maxNrofZP-CSI-RS-ResourceSets)) OF
                                                     ZP-CSI-RS-ResourceSetId
    aperiodic-ZP-CSI-RS-ResourceSetsToAddModList1    SEQUENCE (SIZE
                                                     (1..maxNrofZP-CSI-RS-ResourceSets)) OF
                                                     ZP-CSI-RS-ResourceSet
                                                     OPTIONAL,   -- Need N
    aperiodic-ZP-CSI-RS-ResourceSetsToReleaseList1 SEQUENCE (SIZE
    (1..maxNrofZP-CSI-RS-ResourceSets)) OF ZP-CSI-RS-ResourceSetId
    ...
    aperiodic-ZP-CSI-RS-ResourceSetsToAddModListN-1  SEQUENCE (SIZE
                                                     (1..maxNrofZP-CSI-RS-ResourceSets)) OF
                                                     ZP-CSI-RS-ResourceSet
                                                     OPTIONAL, -- Need N
    aperiodic-ZP-CSI-RS-ResourceSetsToReleaseListN-1 SEQUENCE (SIZE
    (1..maxNrofZP-CSI-RS-ResourceSets)) OF ZP-CSI-RS-ResourceSetId
    ...
}.
```

In this way, aperiodic-ZP-CSI-RS-ResourceSetsToAddModList i and/or aperiodic-ZP-CSI-RS-ResourceSetsToReleaseList i correspond to the parameter of the i-th group of aperiodic ZP CSI-RS, i=0, . . . , N−1, and N is an integer greater than 1.

For another example, in the case where the rate matching parameter is the semi-persistent ZP CSI-RS, in the PDSCH-Config, the sp-ZP-CSI-RS-ResourceSetsToAddModList and the sp-ZP-CSI-RS-ResourceSetsToReleaseList are expanded into N shares respectively corresponding to N rate matching parameter groups as follows:

```
PDSCH-Config ::=                        SEQUENCE {
  ...
    sp-ZP-CSI-RS-ResourceSetsToAddModList0    SEQUENCE (SIZE
                                              (1..maxNrofZP-CSI-RS-ResourceSets)) OF
                                              ZP-CSI-RS-ResourceSet
                                              OPTIONAL,   -- Need N
    sp-ZP-CSI-RS-ResourceSetsToReleaseList0 SEQUENCE (SIZE (1..maxNrofZP-CSI-RS-ResourceSets)) OF
                                              ZP-CSI-RS-ResourceSetId
    sp-ZP-CSI-RS-ResourceSetsToAddModList1    SEQUENCE (SIZE
                                              (1..maxNrofZP-CSI-RS-ResourceSets)) OF
```

```
                                 ZP-CSI-RS-ResourceSet
                                     OPTIONAL, -- Need N
    sp-ZP-CSI-RS-ResourceSetsToReleaseList1 SEQUENCE (SIZE (1..maxNrofZP-CSI-RS-ResourceSets))
                                     OF ZP-CSI-RS-ResourceSetId
...
    sp-ZP-CSI-RS-ResourceSetsToAddModListN-1    SEQUENCE (SIZE
                                     (1..maxNrofZP-CSI-RS-ResourceSets)) OF
                                     ZP-CSI-RS-ResourceSet
                                     OPTIONAL, -- Need N
    sp-ZP-CSI-RS-ResourceSetsToReleaseListN-1 SEQUENCE (SIZE
                                     (1..maxNrofZP-CSI-RS-ResourceSets)) OF ZP-CSI-RS-ResourceSetId
...
}.
```

In this way, sp-ZP-CSI-RS-ResourceSetsToAddModList i and/or sp-ZP-CSI-RS-ResourceSetsToReleaseList i correspond to the parameter of the i-th group of semi-persistent ZP CSI-RS, i=0, ..., N−1, and N is an integer greater than 1.

For another example, in the case where the rate matching parameter is the periodic ZP CSI-RS, in the PDSCH-Config, the p-ZP-CSI-RS-ResourceSetsToAddModList and the p-ZP-CSI-RS-ResourceSetsToReleaseList are expanded into N shares respectively corresponding to N rate matching parameter groups as follows:

the i-th group of rate matching parameters comes from the ZP CSI-RS resource Set whose RateMatchGroupID satisfies that RateMatchGroupID=i.

In the case where the rate matching parameter is the semi-persistent ZP CSI-RS, the value of semi-persistent ZP CSI-RS i of the i-th group of rate matching parameters comes from the ZP CSI-RS resource Set whose RateMatchGroupID satisfies that RateMatchGroupID=i.

In the case where the rate matching parameter is the aperiodic ZP CSI-RS, the value of aperiodic ZP CSI-RS i of

```
PDSCH-Config ::=             SEQUENCE {
...
    p-ZP-CSI-RS-ResourceSetsToAddModList0        SEQUENCE (SIZE (1..maxNrofZP-CSI-RS-ResourceSets))
                                     OF ZP-CSI-RS-ResourceSet
                                     OPTIONAL, -- Need N
    p-ZP-CSI-RS-ResourceSetsToReleaseList0 SEQUENCE (SIZE (1..maxNrofZP-CSI-RS-ResourceSets)) OF
                                     ZP-CSI-RS-ResourceSetId
    p-ZP-CSI-RS-ResourceSetsToAddModList1)       SEQUENCE (SIZE (1..maxNrofZP-CSI-RS-ResourceSets)
                                     OF ZP-CSI-RS-ResourceSet
                                     OPTIONAL, -- Need N
    p-ZP-CSI-RS-ResourceSetsToReleaseList1 SEQUENCE (SIZE (1..maxNrofZP-CSI-RS-ResourceSets)) OF
                                     ZP-CSI-RS-ResourceSetId
...
    aperiodic-ZP-CSI-RS-ResourceSetsToAddModListN-1        SEQUENCE (SIZE
                                     (1..maxNrofZP-CSI-RS-ResourceSets)) OF
                                     ZP-CSI-RS-ResourceSet
                                     OPTIONAL, -- Need N
    p-ZP-CSI-RS-ResourceSetsToReleaseListN-1 SEQUENCE (SIZE (1..maxNrofZP-CSI-RS-ResourceSets))
                                     OF ZP-CSI-RS-ResourceSetId
...
}.
```

In this way, p-ZP-CSI-RS-ResourceSetsToAddModList i and/or p-ZP-CSI-RS-ResourceSetsToReleaseList i correspond to the parameter of the i-th group of periodic ZP CSI-RS, i=0, ..., N−1, and N is an integer greater than 1.

In an embodiment, in the related art, a sub-parameter, that is, a RateMatchGroupID, is added to the ZP-CSI-RS-ResourceSet as follows. The value of the RateMatchGroupID is an integer greater than or equal to 0 and less than N, and N is an integer greater than 1.

```
    ZP-CSI-RS-ResourceSet ::=    SEQUENCE {
        zp-CSI-RS-ResourceSetId      ZP-CSI-RS-ResourceSetId,
        RateMatchGroupID             INTEGER (0...N-1)
        ...
    }.
```

Thus, cases described below exist.

In the case where the rate matching parameter is the periodic ZP CSI-RS, the value of periodic ZP CSI-RS i of the i-th group of rate matching parameters comes from the ZP CSI-RS resource Set whose RateMatchGroupID satisfies that RateMatchGroupID=i.

The fourth exemplary implementation is used for illustrating higher layer signaling configuration of the rate matching parameters or the grouping and values of the rate matching parameters in the case where the rate matching parameter is the NZP CSI-RS (including at least one of the periodic NZP CSI-RS or the semi-persistent NZP CSI-RS). Since the periodic NZP CSI-RS and the semi-persistent NZP CSI-RS are much the same in configuration, the periodic NZP CSI-RS and the semi-persistent NZP CSI-RS are described together herein.

In order that the rate matching of the joint transmission of N network side devices to the same terminal is better supported, the parameter related to the rate matching is increased to N shares, and each share of parameter corresponds to one rate matching parameter group and the N shares of parameter are used for indicating that physical channels corresponding to the N network side devices perform rate matching.

For example, in the case where the rate matching parameter is the periodic NZP CSI-RS or the semi-persistent NZP CSI-RS, the rate matching parameter is expanded into N shares respectively corresponding to N rate matching parameter groups through at least one of manners described below.

In manner 1, in the CSI-MeasConfig, the nzp-CSI-RS-ResourceToAddModList and/or the nzp-CSI-RS-ResourceToReleaseList are expanded into N shares respectively corresponding to N rate matching parameter groups as follows:

```
CSI-Meas-Config ::=                    SEQUENCE {
  ...
  nzp-CSI-RS-ResourceToAddModList0     SEQUENCE (SIZE (1..maxNrofNZP-CSI-RS-Resources)) OF
    NZP-CSI-RS-Resource                  OPTIONAL, -- Need N
  nzp-CSI-RS-ResourceToReleaseList0    SEQUENCE (SIZE (1..maxNrofNZP-CSI-RS-Resources)) OF
    NZP-CSI-RS-ResourceId                OPTIONAL, -- Need N
  nzp-CSI-RS-ResourceToAddModList1     SEQUENCE (SIZE (1..maxNrofNZP-CSI-RS-Resources)) OF
    NZP-CSI-RS-Resource                  OPTIONAL, -- Need N
  nzp-CSI-RS-ResourceToReleaseList1    SEQUENCE (SIZE (1..maxNrofNZP-CSI-RS-Resources)) OF
    NZP-CSI-RS-ResourceId                OPTIONAL, -- Need N
  ...
  nzp-CSI-RS-ResourceToAddModListN-1   SEQUENCE (SIZE (1..maxNrofNZP-CSI-RS-Resources)) OF
    NZP-CSI-RS-Resource                  OPTIONAL, -- Need N
  nzp-CSI-RS-ResourceToReleaseListN-1  SEQUENCE (SIZE (1..maxNrofNZP-CSI-RS-Resources)) OF
    NZP-CSI-RS-ResourceId                OPTIONAL, -- Need N
}.
```

In this way, nzp-CSI-RS-ResourceToAddModList i and/or nzp-CSI-RS-ResourceToReleaseList i correspond to the i-th group of rate matching parameters, i=0, ..., N−1, and N is an integer greater than 1.

In manner 2, in the CSI-MeasConfig, the nzp-CSI-RS-ResourceSetToAddModList and the nzp-CSI-RS-ResourceSetToReleaseList are expanded into N shares respectively corresponding to N rate matching parameter groups as follows:

```
CSI-Meas-Config ::=                       SEQUENCE {
  ...
  nzp-CSI-RS-ResourceSetToAddModList0      SEQUENCE (SIZE (1..maxNrofNZP-CSI-RS-ResourceSets)) OF
              NZP-CSI-RS-ResourceSet       OPTIONAL, -- Need N
  nzp-CSI-RS-ResourceSetToReleaseList0     SEQUENCE (SIZE (1..maxNrofNZP-CSI-RS-ResourceSets)) OF
              NZP-CSI-RS-ResourceSetId     OPTIONAL, -- Need N
  nzp-CSI-RS-ResourceSetToAddModList1      SEQUENCE (SIZE (1..maxNrofNZP-CSI-RS-ResourceSets)) OF
              NZP-CSI-RS-ResourceSet       OPTIONAL, -- Need N
  nzp-CSI-RS-ResourceSetToReleaseList1     SEQUENCE (SIZE (1..maxNrofNZP-CSI-RS-ResourceSets)) OF
              NZP-CSI-RS-ResourceSetId     OPTIONAL, -- Need N
  ...
  nzp-CSI-RS-ResourceSetToAddModListN−1    SEQUENCE (SIZE (1..maxNrofNZP-CSI-RS-ResourceSets))
              OF NZP-CSI-RS-ResourceSet    OPTIONAL, -- Need N
  nzp-CSI-RS-ResourceSetToReleaseListN−1   SEQUENCE (SIZE (1..maxNrofNZP-CSI-RS-ResourceSets)) OF
              NZP-CSI-RS-ResourceSetId     OPTIONAL, -- Need N
  ...
}.
```

In this way, nzp-CSI-RS-ResourceSetToAddModList i and/or nzp-CSI-RS-ResourceSetToReleaseList i correspond to the i-th group of rate matching parameters, i=0, ..., N−1, and N is an integer greater than 1.

In manner 3, in the CSI-MeasConfig, the csi-ResourceConfigToAddModList and the csi-ResourceConfigToReleaseList are expanded into N shares respectively corresponding to N rate matching parameter groups as follows:

```
CSI-Meas-Config ::=                    SEQUENCE {
  ...
  csi-ResourceConfigToAddModList0        SEQUENCE (SIZE (1..maxNrofCSI-ResourceConfigurations)) OF
              CSI-ResourceConfig           OPTIONAL, -- Need N
  csi-ResourceConfigToReleaseList0       SEQUENCE (SIZE (1..maxNrofCSI-ResourceConfigurations)) OF
              CSI-ResourceConfigId         OPTIONAL, -- Need N
  ...
  csi-ResourceConfigToAddModList1        SEQUENCE (SIZE (1..maxNrofCSI-ResourceConfigurations)) OF
              CSI-ResourceConfig           OPTIONAL, -- Need N
  csi-ResourceConfigToReleaseList1       SEQUENCE (SIZE (1..maxNrofCSI-ResourceConfigurations)) OF
              CSI-ResourceConfigId         OPTIONAL, -- Need N
```

```
...
csi-ResourceConfigToAddModListN-1    SEQUENCE (SIZE (1..maxNrofCSI-ResourceConfigumtions))
                                     OF CSI-ResourceConfig    OPTIONAL, -- Need N
csi-ResourceConfigToReleaseListN-1   SEQUENCE (SIZE (1..maxNrofCSI-ResourceConfigurations))
                                     OF CSI-ResourceConfigId  OPTIONAL, -- Need N
...
}.
```

In this way, csi-ResourceConfigToAddModList i and/or csi-ResourceConfigToReleaseList i correspond to the i-th group of rate matching parameters, i=0, . . . , N−1, and N is an integer greater than 1.

In manner 4, in the CSI-MeasConfig, the csi-ReportConfigToAddModList and the csi-ReportConfigToReleaseList are expanded into N shares respectively corresponding to N rate matching parameter groups as follows:

```
CSI-Meas-Config ::=                SEQUENCE {
  ...
  csi-ReportConfigToAddModList0      SEQUENCE (SIZE (1..maxNrofCSI-ReportConfigurations)) OF
                                     CSI-ReportConfig    OPTIONAL, -- Need N
  csi-ReportConfigToReleaseList0     SEQUENCE (SIZE (1.. maxNrofCSI-ReportConfigurations)) OF
                                     CSI-ReportConfigId  OPTIONAL, -- Need N
  ...
  csi-ReportConfigToAddModList1      SEQUENCE (SIZE (1..maxNrofCSI-ReportConfigurations)) OF
                                     CSI-ReportConfig    OPTIONAL, -- Need N
  csi-ReportConfigToReleaseList1     SEQUENCE (SIZE (1..maxNrofCSI-ReportConfigurations)) OF
                                     CSI-ReportConfigId  OPTIONAL, -- Need N
  ...
  csi-ReportConfigToAddModListN-1    SEQUENCE (SIZE (1..maxNrofCSI-ReportConfigurations)) OF
                                     CSI-ReportConfig    OPTIONAL, -- Need N
  csi-ReportConfigToReleaseListN-1   SEQUENCE (SIZE (1..maxNrofCSI-ReportConfigurations)) OF
                                     CSI-ReportConfigId  OPTIONAL, -- Need N
  ...
}.
```

In this way, csi-ReportConfigToAddModList i and/or csi-ReportConfigToReleaseList i correspond to the i-th group of rate matching parameters, i=0, . . . , N−1, and N is an integer greater than 1.

In an embodiment, in the related art, a sub-parameter, that is, a RateMatchGroupID, is added to the NZP-CSI-RS-ResourceSet as follows. The value of the RateMatchGroupID is an integer greater than or equal to 0 and less than N, and N is an integer greater than 1.

```
NZP-CSI-RS-ResourceSet ::=   SEQUENCE {
  Nzp-CSI-RS-ResourceSetId     NZP-CSI-RS-ResourceSetId,
  RateMatchGroupID             INTEGER (0...N-1)
  ...
}.
```

In an embodiment, in the related art, a sub-parameter, that is, a RateMatchGroupID, is added to the NZP-CSI-RS-Resource as follows. The value of the RateMatchGroupID is an integer greater than or equal to 0 and less than N, and N is an integer greater than 1.

```
NZP-CSI-RS-Resource ::=   SEQUENCE {
  Nzp-CSI-RS-ResourceId     NZP-CSI-RS-ResourceId,
  RateMatchGroupID          INTEGER (0...N-1)
  ...
}.
```

In an embodiment, in the related art, a sub-parameter, that is, a RateMatchGroupID, is added to the CSI-ResourceConfig as follows. The value of the RateMatchGroupID is an integer greater than or equal to 0 and less than N, and N is an integer greater than 1.

```
CSI-ResourceConfig ::=   SEQUENCE {
  csi-ResourceConfigId     CSI-ResourceConfigId,
  RateMatchGroupID         INTEGER (0...N-1)
  ...
}.
```

In an embodiment, in the related technology, a sub-parameter, that is, a RateMatchGroupID, is added to the CSI-ReportConfig as follows. The value of the RateMatchGroupID is an integer greater than or equal to 0 and less than N, and N is an integer greater than 1.

```
CSI-ReportConfig ::=   SEQUENCE {
  csi-ReportConfigId     CSI-ReportConfigId,
  RateMatchGroupID       INTEGER (0...N-1)
  ...
}.
```

Thus, cases described below exist.

In the case where the rate matching parameter is the periodic NZP CSI-RS, the value of periodic ZP CSI-RS i of the i-th group of rate matching parameters is from the ZP CSI-RS resource Set (or the NZP CSI-RS resource Set corresponding to the NZP CSI-RS resource and the CSI-ResourceConfig, or the NZP CSI-RS resource Set corresponding to the CSI reportconfig) whose RateMatchGroupID satisfies that RateMatchGroupID=i In the case where the rate matching parameter is the semi-persistent NZP CSI-RS, the value of semi-persistent ZP CSI-RS i of the i-th group of rate matching parameters is from the ZP CSI-RS resource Set (or the NZP CSI-RS resource Set corresponding to the NZP CSI-RS resource and the CSI-ResourceConfig, or the NZP CSI-RS resource Set corresponding to the CSI reportconfig) whose RateMatchGroupID satisfies that RateMatchGroupID=i.

The fifth exemplary implementation is used for illustrating higher layer signaling configuration of the rate matching parameters or the grouping and values of the rate matching parameters in the case where the rate matching parameter is the SSB.

In order that the rate matching of the joint transmission of N network side devices to the same terminal is better supported, the parameter related to the rate matching is increased to N shares, and each share of parameter corresponds to one rate matching parameter group and is used for indicating that physical channels corresponding to the N network side devices perform rate matching.

For example, in the case where the rate matching parameter is the SSB, in the ServingCellConfigCommon, the ssb-PositionsInBurst is expanded into N shares respectively corresponding to N rate matching parameter groups as follows:

```
ServingCellConfigCommon ::=    SEQUENCE {
    ...
    ssb-PositionsInBurst0      CHOICE {
        shortBitmap                BIT STRING (SIZE (4)),
        mediumBitmap               BIT STRING (SIZE (8)),
        longBitmap                 BIT STRING (SIZE (64))
    }
    ...
    ssb-PositionsInBurst1      CHOICE {
        shortBitmap                BIT STRING (SIZE (4)),
        mediumBitmap               BIT STRING (SIZE (8)),
        longBitmap                 BIT STRING (SIZE (64))
    }
    ...
    ssb-PositionsInBurstN-1    CHOICE {
        shortBitmap                BIT STRING (SIZE (4)),
        mediumBitmap               BIT STRING (SIZE (8)),
        longBitmap                 BIT STRING (SIZE (64))
    }
    ...
}.
```

In this way, ssb-PositionsInBurst i corresponds to the i-th group of rate matching parameters, i=0, . . . , N−1, and N is an integer greater than 1.

The sixth exemplary implementation is used for illustrating higher layer signaling configuration of the rate matching parameters or the grouping and values of the rate matching parameters in the case where the rate matching parameter is the lte-CRS-ToMatchAround.

In order that the rate matching of the joint transmission of N network side devices to the same terminal is better supported, the parameter related to the rate matching is increased to N shares, and each share of parameter corresponds to one rate matching parameter group and N shares of parameter are used for indicating that physical channels corresponding to the N network side devices perform rate matching.

For example, in the case where the rate matching parameter is the lte-CRS-ToMatchAround, in the ServingCellConfigCommon, the lte-CRS-ToMatchAround is expanded into N shares respectively corresponding to N rate matching parameter groups as follows:

```
ServingCellConfigCommon ::=    SEQUENCE {
    ...
    lte-CRS-ToMatchAround0         SetupRelease { RateMatchPatternLTE-CRS } OPTIONAL,
    lte-CRS-ToMatchAround1         SetupRelease { RateMatchPatternLTE-CRS } OPTIONAL,
    ...
    lte-CRS-ToMatchAroundN−1       SetupRelease {RateMatchPatternLTE-CRS }OPTIONAL,
    ...
}.
```

In this way, lte-CRS-ToMatchAround i corresponds to the i-th group of rate matching parameters, i=0, . . . , N−1, and N is an integer greater than 1.

In an embodiment,

```
ServingCellConfigCommon ::=    SEQUENCE {
    ...
    lte-CRS-ToMatchAround          SEQUENCE (SIZE (1..N))OF RateMatchPatternLTE-CRS
    OPTIONAL,                          OPTIONAL,
    ...
}.
```

The i-th element of the lte-CRS-ToMatchAround array corresponds to the i-th group of rate matching parameters, i=0, . . . , N−1, and N is an integer greater than 1.

In an embodiment, in the related art, a sub-parameter, that is, a RateMatchGroupID, is added to the RateMatchPatternLTE-CRS as follows. The value of the RateMatchGroupID is an integer greater than or equal to 0 and less than N, and N is an integer greater than 1.

```
RateMatchPatternLTE-CRS ::=    SEQUENCE {
    RateMatchGroupID               INTEGER (0...N−1)
    ...
}.
```

Thus, the case described below exists.

In the case where the rate matching parameter is the lte-CRS-ToMatchAround, the value of lte-CRS-ToMatchAround i of the i-th group of rate matching parameters comes from the RateMatchPatternLTE-CRS whose RateMatchGroupID satisfies that RateMatchGroupID=i.

The seventh exemplary implementation is used for illustrating higher layer signaling configuration of the rate matching parameters or the grouping and values of the rate matching parameters in the case where the rate matching parameter is the downlinkPreemption.

In order that the rate matching of the joint transmission of N network side devices to the same terminal is better supported, the parameter related to the rate matching is increased to N shares, and each share of parameter corresponds to one rate matching parameter group and the N shares of parameter are used for indicating that physical channels corresponding to the N network side devices perform rate matching.

For example, in the case where the rate matching parameter is the downlinkPreemption, in the PDCCH-Config, the downlinkPreemption is expanded into N shares respectively corresponding to N rate matching parameter groups as follows:

```
PDCCH-Config ::=        SEQUENCE {
...
    downlinkPreemption0     SetupRelease { DownlinkPreemption }  OPTIONAL,
    downlinkPreemption1     SetupRelease { DownlinkPreemption }  OPTIONAL,
...
    downlinkPreemptionN-1   SetupRelease { DownlinkPreemption }  OPTIONAL,
...
}.
```

In this way, downlinkPreemption i corresponds to the parameter of the i-th group of downlinkPreemption, i=0, . . . , N−1, and N is an integer greater than 1.

In an embodiment, in the related art, a sub-parameter, that is, a RateMatchGroupID, is added to the DownlinkPreemption as follows. The value of the RateMatchGroupID is an integer greater than or equal to 0 and less than N, and N is an integer greater than 1.

```
DownlinkPreemption              SEQUENCE {
    RateMatchGroupID                INTEGER (0...N-1)
    int-RNTI                        RNTI-Value,
    timeFrequencySet                ENUMERATED {set0, set1},
    dci-PayloadSize                 INTEGER (0..maxINT-DCI-PayloadSize),
    int-ConfigurationPerServingCell SEQUENCE (SIZE (1..maxNrofServingCells)) OF
INT-ConfigurationPerServingCell,
    ...
}.
```

Thus, the case described below exists.

In the case where the rate matching parameter is downlinkPreemption, the value of downlinkPreemption i of the i-th group of rate matching parameters comes from the DownlinkPreemption whose RateMatchGroupID satisfies that RateMatchGroupID=i.

The eighth exemplary implementation is used for illustrating higher layer signaling configuration of the rate matching parameters or the grouping and values of the rate matching parameters in the case where the rate matching parameter is the CORESET.

In order that the rate matching of the joint transmission of N network side devices to the same terminal is better supported, the parameter related to the rate matching is increased to N shares, and each share of parameter corresponds to one rate matching parameter group and the N shares of parameter are used for indicating that physical channels corresponding to the N network side devices perform rate matching.

For example, in the case where the rate matching parameter is the CORESET, in the PDCCH-Config, the controlResourceSetToAddModList and/or the controlResourceSetToReleaseList are expanded into N shares respectively corresponding to N rate matching parameter groups as follows:

```
PDCCH-Config ::=        SEQUENCE {
...
controlResourceSetToAddModList0     SEQUENCE(SIZE (1..3)) OF ControlResourceSet
```

```
                        OPTIONAL,      -- Need N
    controlResourceSetToReleaseList0   SEQUENCE(SIZE (1..3)) OF ControlResourceSetId
                        OPTIONAL,      -- Need N
    ....
    controlResourceSetToAddModList1    SEQUENCE(SIZE (1..3)) OF ControlResourceSet
                        OPTIONAL,      -- Need N
    controlResourceSetToReleaseList1   SEQUENCE(SIZE (1..3)) OF ControlResourceSetId
                        OPTIONAL,      -- Need N
    ....
    controlResourceSetToAddModListN-1  SEQUENCE(SIZE (1..3)) OF ControlResourceSet
                        OPTIONAL,      -- Need N
    controlResourceSetToReleaseListN-1 SEQUENCE(SIZE (1..3)) OF ControlResourceSetId
                        OPTIONAL,      -- Need N
```

In this way, controlResourceSetToAddModList i and/or controlResourceSetToReleaseList i correspond to the i-th group of rate matching parameters, i=0, . . . , N−1, and N is an integer greater than 1.

In an embodiment, in the related art, a sub-parameter, that is, a RateMatchGroupID, is added to the ControlResourceSet as follows. The value of the RateMatchGroupID is an integer greater than or equal to 0 and less than N, and N is an integer greater than 1.

```
ControlResourceSet ::=   SEQUENCE {
    controlResourceSetId   ControlResource SetId,
    RateMatchGroupID       INTEGER(0ource
    ...
}.
```

Thus, the case described below exists.

In the case where the rate matching parameter is a CORESET, the value of controlResourceSetToAddModList i and/or controlResourceSetToReleaseList i of the i-th group of rate matching parameters comes from the ControlResourceSet whose RateMatchGroupID satisfies that RateMatchGroupID=i.

It should be noted that in all the above examples of the present disclosure, the definition of the parameters only lists the sub-parameters related to the present disclosure, while the parameters that are not related to the present disclosure are not listed. N is an integer greater than 1.

Figure 3:
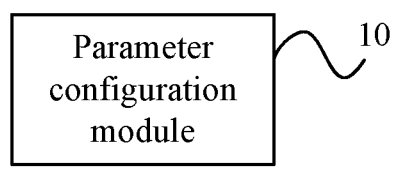
FIG. 3 is a structural diagram of a rate matching apparatus according to an embodiment.

FIG. 3 is a structural diagram of a rate matching apparatus according to an embodiment. The rate matching apparatus may be configured in a sending terminal. As shown in FIG. 3, the rate matching apparatus includes: a parameter configuration module 10 configured to configure N groups of rate matching parameters. The N groups of rate matching parameters are used for indicating rate matching resources corresponding to N groups of physical channels, and N is an integer greater than 1.

The rate matching apparatus provided in the embodiment is configured to implement the rate matching method of the embodiment shown in FIG. 1 and has a similar implementation principle and technical effect, which is not repeated herein.

Figure 4:
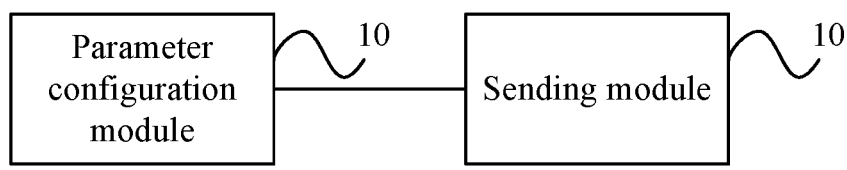
FIG. 4 is a structural diagram of another rate matching apparatus according to an embodiment.

In an embodiment, in conjunction with FIG. 3, FIG. 4 is a structural diagram of another rate matching apparatus according to an embodiment. The apparatus further includes: a sending module 11.

The sending module 11 is configured to send the N groups of rate matching parameters through higher layer signaling and/or physical layer signaling.

In an embodiment, the rate matching parameters include at least one of following parameters: a rateMatchPatternToAddModList, a rateMatchPatternGroup1, a rateMatchPatternGroup2, a periodic ZP CSI-RS, a semi-persistent ZP CSI-RS, an aperiodic ZP CSI-RS, a periodic NZP CSI-RS, a semi-persistent NZP CSI-RS, an SSB, downlinkPreemption, an lte-CRS-ToMatchAround or a controlResourceSetToAddModList.

In an embodiment, the physical channels are physical downlink shared channels (PDSCHs). The N groups of rate matching parameters being used for indicating the rate matching resources corresponding to the N groups of physical channels refers to that the i-th group of rate matching parameters are used for indicating rate matching resources corresponding to PDSCHs scheduled by the i-th group of physical downlink control channels (PDCCHs). The i-th group of PDCCHs come from the i-th group of CORESETs, i=0, . . . , N−1, and N is an integer greater than 1.

In an embodiment, the physical channels are PDCCHs. The N groups of rate matching parameters being used for indicating the rate matching resources corresponding to the N groups of physical channels refers to that the i-th group of rate matching parameters are used for indicating rate matching resources corresponding to the i-th group of PDCCHs. The i-th group of PDCCHs come from the i-th group of CORESETs, i=0, . . . , N−1, and N is an integer greater than 1.

In an embodiment, the same group of rate matching parameters of the N groups of rate matching parameters include the same RateMatchGroupID, the RateMatchGroupID is an integer greater than or equal to 0 and less than N, and N is an integer greater than 1.

In an embodiment, for the i-th group of rate matching parameters, the RateMatchGroupID of the i-th group of rate matching parameters satisfies that RateMatchGroupID=i, i=0, . . . , N−1, and N is an integer greater than 1.

In an embodiment, the RateMatchGroupID is a sub-parameter of any one of following parameters: a RateMatchPattern, a ZP CSI-RS resource Set, an NZP CSI-RS resource Set, an NZP CSI-RS resource Set, an NZP CSI-RS resource, NZP CSI-RS resource Set config, CSI reportconfig, DownlinkPreemption, a RateMatchPatternLTE-CRS or a ControlResourceSet.

In an embodiment, a parameter related to the rate matching of at least one of following parameters is expanded into N shares, where the i-th share of parameter related to the rate matching corresponds to the i-th group of rate matching parameters, i=0, . . . , N−1, and N is an integer greater than 1: PDSCH-Config, PDCCH-Config, ServingCellConfigCommon or CSI-MeasConfig.

Figure 5:
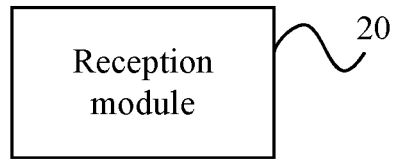
FIG. 5 is a structural diagram of another rate matching apparatus according to an embodiment.

FIG. 5 is a structural diagram of another rate matching apparatus according to an embodiment. The rate matching apparatus may be configured in a reception terminal. As shown in FIG. 5, the rate matching apparatus includes: a reception module 20 configured to receive N groups of rate matching parameters. The N groups of rate matching parameters are used for indicating rate matching resources corresponding to N groups of physical channels, and N is an integer greater than 1.

The rate matching apparatus provided in the embodiment is configured to implement the rate matching method of the embodiment shown in FIG. 2 and has a similar implementation principle and technical effect, which is not repeated herein.

In an embodiment, the reception module 20 is configured to receive the N groups of rate matching parameters through higher layer signaling and/or physical layer signaling.

In an embodiment, the rate matching parameters include at least one of following parameters: a rateMatchPatternToAddModList, a rateMatchPatternGroup1, a rateMatchPatternGroup2, a periodic ZP CSI-RS, a semi-persistent ZP CSI-RS, an aperiodic ZP CSI-RS, a periodic NZP CSI-RS, a semi-persistent NZP CSI-RS, an SSB, downlinkPreemption, an lte-CRS-ToMatchAround or a controlResourceSetToAddModList.

In an embodiment, the physical channels are physical downlink shared channels (PDSCHs). The N groups of rate matching parameters being used for indicating the rate matching resources corresponding to the N groups of physical channels refers to that the i-th group of rate matching parameters are used for indicating rate matching resources corresponding to PDSCHs scheduled by the i-th group of physical downlink control channels (PDCCHs). The i-th group of PDCCHs come from the i-th group of CORESETs, i=0, . . . , N−1, and N is an integer greater than 1.

In an embodiment, the physical channels are PDCCHs. The N groups of rate matching parameters being used for indicating the rate matching resources corresponding to the N groups of physical channels refers to that the i-th group of rate matching parameters are used for indicating rate matching resources corresponding to the i-th group of PDCCHs. The i-th group of PDCCHs come from the i-th group of CORESETs, i=0, . . . , N−1, and N is an integer greater than 1.

In an embodiment, the same group of rate matching parameters of the N groups of rate matching parameters include the same RateMatchGroupID, the RateMatchGroupID is an integer greater than or equal to 0 and less than N, and N is an integer greater than 1.

In an embodiment, for the i-th group of rate matching parameters, the RateMatchGroupID of the i-th group of rate matching parameters satisfies that RateMatchGroupID=i, i=0, . . . , N−1, and N is an integer greater than 1.

In an embodiment, the RateMatchGroupID is a sub-parameter of any one of following parameters: a RateMatchPattern, a ZP CSI-RS resource Set, an NZP CSI-RS resource Set, an NZP CSI-RS resource Set, an NZP CSI-RS resource, NZP CSI-RS resource Set config, CSI reportconfig, DownlinkPreemption, a RateMatchPatternLTE-CRS or a ControlResourceSet.

In an embodiment, a parameter related to the rate matching of at least one of following parameters is expanded into N shares, where the i-th share of parameter related to the rate matching corresponds to the i-th group of rate matching parameters, i=0, . . . , N−1, and N is an integer greater than 1: PDSCH-Config, PDCCH-Config, ServingCellConfigCommon or CSI-MeasConfig.

Figure 6:
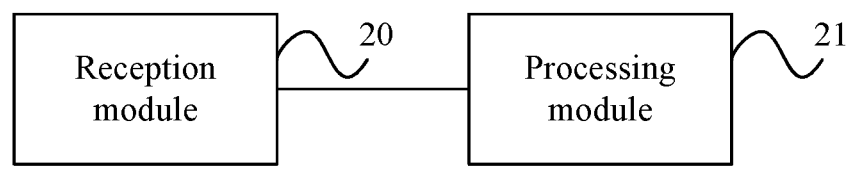
FIG. 6 is a structural diagram of another rate matching apparatus according to an embodiment.

In an embodiment, in conjunction with FIG. 5, FIG. 6 is a structural diagram of another rate matching apparatus according to an embodiment. The apparatus further includes: a processing module 21.

The rate matching parameters include an lte-CRS-ToMatchAround; the processing module 21 is configured to in response to a resource element (RE) of the i-th group of PDCCHs being the same as an RE corresponding to a time-frequency resource indicated by an lte-CRS-ToMatchAround of the i-th group of rate matching parameters, not receive or ignore the i-th group of PDCCHs; or in response to an RE of the i-th group of PDCCHs being the same as an RE corresponding to a time-frequency resource indicated by an lte-CRS-ToMatchAround of any group of rate matching parameters, not receive or ignore the i-th group of PDCCHs; the i-th group of PDCCHs come from the i-th group of CORESETs, i=0, . . . , N−1, and N is an integer greater than 1.

Figure 7:
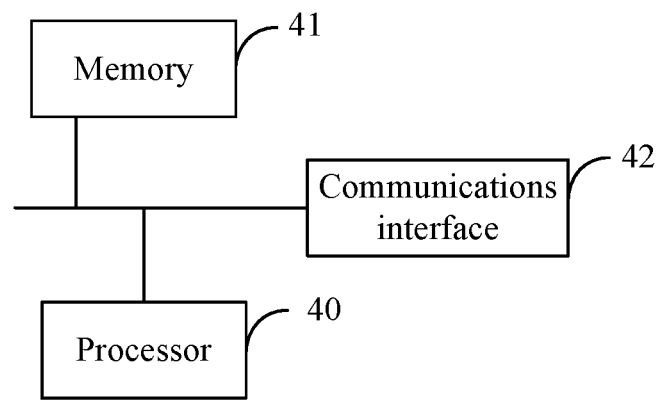
FIG. 7 is a structural diagram of a base station according to an embodiment.

FIG. 7 is a structural diagram of a base station according to an embodiment. As shown in FIG. 7, the base station includes a processor 40, a memory 41 and a communications interface 42. One or more processors 40 may be provided in the base station, and one processor 40 is used as an example in FIG. 7. The processor 40, the memory 41 and the communications interface 42 in the base station may be connected through a bus or in other manners. In FIG. 7, the connection through a bus is used as an example. The bus represents one or more of several types of bus structures, including a memory bus or a memory controller, a peripheral bus, an accelerated graphics port, a processor or a local bus using any bus structure among multiple bus structures.

As a computer-readable storage medium, the memory 41 may be configured to store software programs, computer executable programs and modules, such as program instructions/modules corresponding to the rate matching method in the embodiments of the present disclosure. The processor 40 runs the software programs, instructions and modules stored in the memory 41 to execute at least one of function applications and data processing of the base station, that is, to implement the rate matching method described above.

The memory 41 may include a program storage region and a data storage region. The program storage region may store an operating system and an application program required by at least one function; and the data storage region may store data created depending on use of a terminal. In addition, the memory 41 may include a high-speed random access memory and may also include a non-volatile memory such as at least one magnetic disk memory device, flash memory device or other non-volatile solid-state memory device. In some examples, the memory 41 may include memories that are remotely disposed with respect to the processor 40. These remote memories may be connected to the base station via a network. The examples of the preceding network include, but are not limited to, the Internet, an intranet, a local area network, a mobile communication network, and a combination thereof.

The communications interface 42 may be configured to receive and send data.

Figure 8:
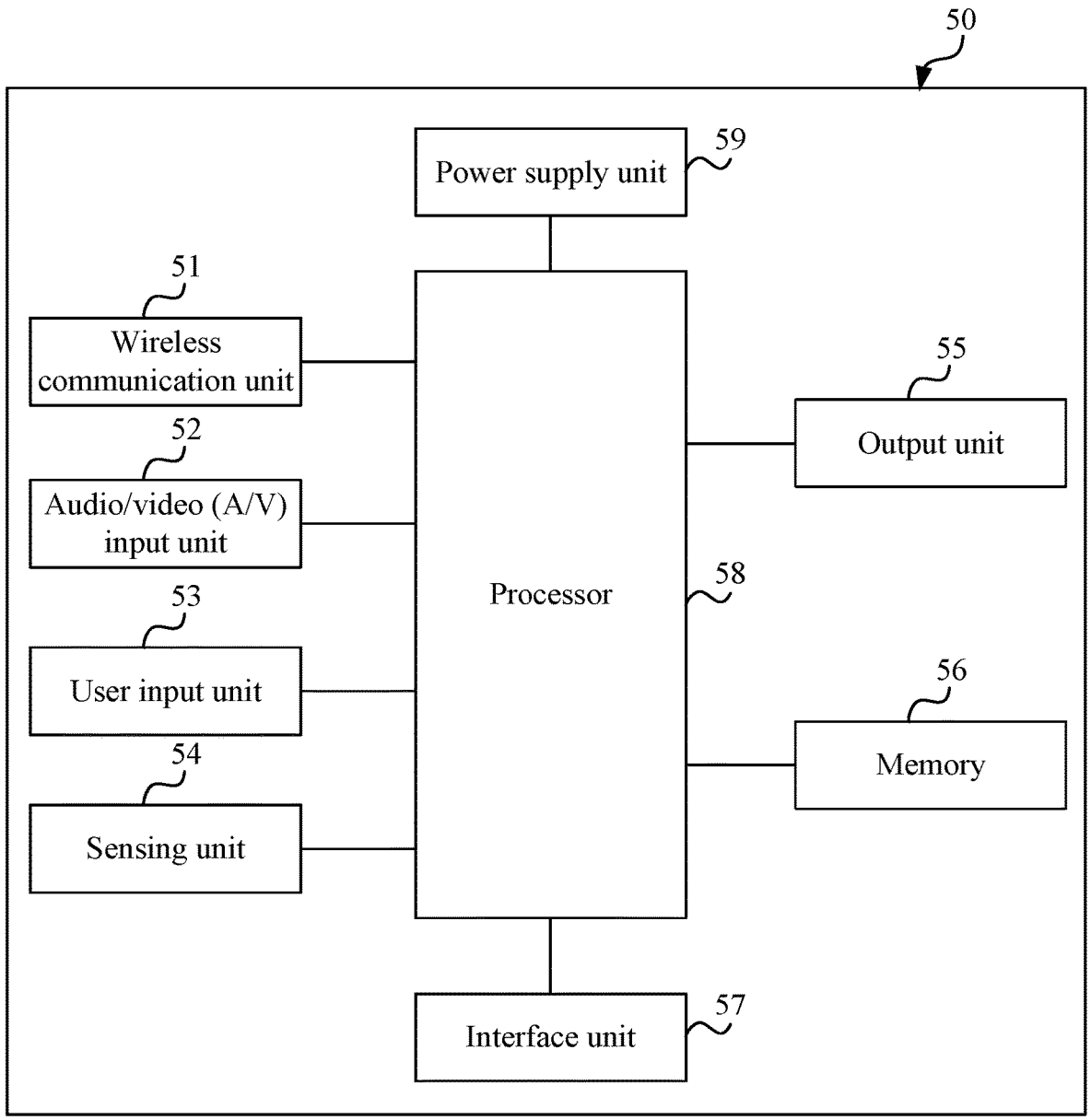
FIG. 8 is a structural diagram of a UE according to an embodiment.

FIG. 8 is a structural diagram of a UE according to an embodiment. The UE may be implemented in multiple forms. The UE in the present disclosure includes, but is not limited to, mobile terminal devices such as a mobile phone, a smart phone, a notebook computer, a digital broadcast receiver, a personal digital assistant (PDA), a portable device (PAD), a portable media player (PMP), a navigation apparatus, a vehicle-mounted terminal device, a vehicle-mounted display terminal and a vehicle-mounted electronic rearview mirror and fixed terminal devices such as a digital television (TV) and a desktop computer.

As shown in FIG. 8, the UE 50 may include a wireless communication unit 51, an audio/video (A/V) input unit 52, a user input unit 53, a sensing unit 54, an output unit 55, a memory 56, an interface unit 57, a processor 58, a power supply unit 59, etc. FIG. 8 illustrates the UE including multiple assemblies; but it should be noted that it is not required to implement all the illustrated assemblies. More or fewer assemblies may be implemented instead.

In the embodiment, the wireless communication unit 51 allows wireless communication between the UE 50 and a base station or a network. The A/V input unit 52 is configured to receive audio or video signals. The user input unit 53 may generate key input data according to commands input by the user to control various operations of the UE 50. The sensing unit 54 detects the current state of the UE 50, the location of the UE 50, the presence or absence of the user's touch input to the UE 50, the orientation of the UE 50, the acceleration or deceleration movement and direction of the UE 50 and so on, and generates commands or signals for controlling the operation of the UE 50. The interface unit 57 serves as an interface through which at least one external apparatus can be connected to the UE 50. The output unit 55 is configured to provide output signals in a visual, audio, and/or tactile manner. The memory 56 may store software programs for processing and controlling operations executed by the processor 58, etc., or may temporarily store data that has been output or will be output. The memory 56 may include at least one type of storage medium. Moreover, the UE 50 may cooperate with a network storage apparatus that performs the storage function of the memory 56 through network connection. The processor 58 is generally configured to control the overall operation of the UE 50. The power supply unit 59 receives external power or internal power under the control of the processor 58 and provides appropriate power required to operate various members and assemblies.

The processor 58 runs the programs stored in the memory 56 to execute at least one function application and data processing, for example, to implement the rate matching method provided by the embodiments of the present disclosure.

An embodiment of the present disclosure further provides a computer-readable storage medium. The computer-readable storage medium is configured to store computer programs which, when executed by a processor, implement the method provided by any one of the embodiments of the present disclosure.

In the embodiment of the present disclosure, the computer storage medium may be any combination of one or more computer-readable media. The computer-readable medium may be a computer-readable signal medium or a computer-readable storage medium. The computer-readable storage medium may be, for example, but is not limited to, an electrical, magnetic, optical, electromagnetic, infrared or semiconductor system, apparatus or device, or any combination thereof. The computer readable storage medium includes (a non-exhaustive list): an electrical connection having one or more wires, a portable computer disk, a hard disk, a random access memory (RAM), a read-only memory (ROM), an electrically erasable, programmable read-only memory (EPROM), a flash memory, an optical fiber, a portable compact disk read-only memory (CD-ROM), an optical memory device, a magnetic memory device, or any suitable combination thereof. In the present disclosure, the computer-readable storage medium may be any tangible medium including or storing a program. The program may be used by an instruction execution system, apparatus, or device or used in conjunction with the instruction execution system, apparatus, or device.

The computer-readable signal medium may include a data signal propagated in a baseband or as part of a carrier, and the data signal carries computer-readable program codes. Such a propagated data signal may be in various forms that include, but are not limited to, an electromagnetic signal, an optical signal, or any suitable combination thereof. The computer-readable signal medium may further be any computer-readable medium other than the computer-readable storage medium. The computer-readable medium may send, propagate or transmit a program used by an instruction execution system, apparatus, or device or used in conjunction with the instruction execution system, apparatus, or device.

Program codes included on the computer-readable medium may be transmitted by using any suitable medium including, but not limited to, a wireless medium, a wire, an optical cable, radio frequency (RF) and the like, or any suitable combination thereof.

Computer program codes for executing the operations of the present disclosure may be written in one or more programming languages or a combination of multiple programming languages. The programming languages include object-oriented programming languages such as Java, Smalltalk, C++, Ruby and Go, as well as conventional procedural programming languages such as "C" or similar programming languages. The program codes may be executed entirely on a user computer, partially on a user computer, as an independent software package, partially on a user computer and partially on a remote computer, or entirely on a remote computer or a server. In the case related to a remote computer, the remote computer may be connected to a user computer via any type of network including a local area network (LAN) or a wide area network (WAN) or may be connected to an external computer (for example, via the Internet through an Internet service provider).

It is to be understood by those skilled in the art that the term, user terminal, encompasses any suitable type of radio user device such as a mobile phone, a portable data processing apparatus, a portable web browser or a vehicle-mounted mobile station.

Generally, various embodiments of the present disclosure may be implemented in hardware, special-purpose circuitry, software, logics, or any combination thereof. For example, some aspects may be implemented in hardware while other aspects may be implemented in firmware or software executable by a controller, a microprocessor or other computing apparatuses, although the present disclosure is not limited thereto.

The embodiments of the present disclosure may be implemented through the execution of computer program instructions by a data processor of a mobile apparatus, for example, implemented in a processor entity, through hardware, or through a combination of software and hardware. The computer program instructions may be assembly instructions, instruction set architecture (ISA) instructions, machine instructions, machine-related instructions, microcodes, firmware instructions, state setting data or source or object codes written in any combination of one or more programming languages.

A block diagram of any logic flow among the drawings of the present disclosure may represent program steps, or may represent interconnected logic circuits, modules and functions, or may represent a combination of program steps and logic circuits, modules and functions. Computer programs may be stored on a memory. The memory may be of any type appropriate for the local technical environment and may be implemented by using any appropriate data storage technology, such as, but not limited to, a read-only memory (ROM), a random access memory (RAM), an optical storage apparatus and system (a digital video disc (DVD) or a compact disk (CD)), and the like. Computer-readable media may include non-transitory storage media. The data processor may be of any type suitable for the local technical environment, such as, but not limited to, a general-purpose computer, a special-purpose computer, a microprocessor, a digital signal processing (DSP), an application-specific integrated circuit (ASIC), a programmable logic device such as a field-programmable gate array (FPGA) and a processor based on multi-core processor architecture.

What is claimed is:

1. A rate matching method, comprising:
configuring N groups of rate matching parameters, wherein
the N groups of rate matching parameters are used for indicating rate matching resources corresponding to N groups of physical channels, the N groups of rate matching parameters separately correspond to the N groups of physical channels one-to-one, and N is an integer greater than 1;
wherein the N groups of rate matching parameters are comprised in N shares of one of following parameters:
PDSCH configuration PDSCH-Config, PDCCH configuration PDCCH-Config, serving cell common configuration ServingCellConfigCommon or channel-state information measurement configuration CSI-MeasConfig;
wherein rate matching parameters in the N groups of rate matching parameters comprise at least one of following parameters:
a synchronisation signal block (SSB), downlink preemption downlinkPreemption, a long term evolution common reference signal match resource lte-CRS-ToMatchAround or a control resource set list controlResourceSetToAddModList.

2. The method according to claim 1, further comprising:
sending the N groups of rate matching parameters through at least one of: higher layer signaling or physical layer signaling.

3. A rate matching apparatus, comprising:
a processor and a memory storing processor-executable instructions which, when executed by the processor, are configured to implement the method of claim 1.

4. The method according to claim 1, wherein the N groups of physical channels are physical downlink shared channels (PDSCHs); and wherein
the N groups of rate matching parameters being used for indicating the rate matching resources corresponding to the N groups of physical channels comprises: the N groups of physical channels being PDSCHs scheduled by N groups of physical downlink control channels (PDCCHs), and an i-th group of rate matching parameters in the N groups of rate matching parameters being used for indicating rate matching resources corresponding to PDSCHs scheduled by an i-th group of PDCCHs in the N groups of PDCCHs, wherein the i-th group of PDCCHs is from an i-th group of control resource sets (CORESETs), i=0, ..., N−1, and N is an integer greater than 1.

5. The method according to claim 1, wherein the N groups of physical channels are PDCCHs; and wherein
the N groups of rate matching parameters being used for indicating the rate matching resources corresponding to the N groups of physical channels comprises: the N groups of physical channels being N groups of PDCCHs, and an i-th group of rate matching parameters in the N groups of rate matching parameters are used for indicating rate matching resources corresponding to an i-th group of PDCCHs in the N groups of PDCCHs, wherein the i-th group of PDCCHs come from an i-th group of CORESETs, i=0, ..., N−1, and N is an integer greater than 1.

6. The method according to claim 1, wherein a same group of rate matching parameters of the N groups of rate matching parameters comprise a same rate match group indicator RateMatchGroupID, the RateMatchGroupID is an integer greater than or equal to 0 and less than N, and N is an integer greater than 1.

7. The method according to claim 6, wherein a RateMatchGroupID of an i-th group of rate matching parameters of the N groups of rate matching parameters satisfies that the RateMatchGroupID=i, i=0, ..., N−1, and N is an integer greater than 1.

8. The method according to claim 6, wherein the RateMatchGroupID is comprised in any one of following parameters:
a rate match pattern RateMatchPattern, a zero power channel-state information reference signal resource set (ZP CSI-RS resource Set), a non zero power channel-state information reference signal resource set (NZP CSI-RS resource Set), a non zero power channel-state information reference signal resource (NZP CSI-RS resource), non zero power channel-state information reference signal resource set configuration (NZP CSI-RS resource Set config), channel-state information report configuration (CSI reportconfig), downlink preemption DownlinkPreemption, an LTE common reference signal rate match pattern RateMatchPatternLTE-CRS or a control resource set ControlResourceSet.

9. A rate matching method, comprising:
receiving N groups of rate matching parameters, wherein the N groups of rate matching parameters are used for indicating rate matching resources corresponding to N groups of physical channels, the N groups of rate matching parameters separately correspond to the N groups of physical channels one-to-one and N is an integer greater than 1;
wherein the N groups of rate matching parameters are comprised in N shares of one of following parameters:
PDSCH configuration PDSCH-Config, PDCCH configuration PDCCH-Config, serving cell common configuration ServingCellConfigCommon or channel-state information measurement configuration CSI-MeasConfig;
wherein rate matching parameters in the N groups of rate matching parameters comprise at least one of following parameters:
a synchronisation signal block (SSB), downlink preemption downlinkPreemption, a long term evolution common reference signal match resource lte-CRS-ToMatchAround or a control resource set list controlResourceSetToAddModList.

10. The method according to claim 9, wherein receiving the N groups of rate matching parameters comprises:
receiving the N groups of rate matching parameters through at least one of: higher layer signaling or physical layer signaling.

11. The method according to claim 9, wherein the N groups of physical channels are physical downlink shared channels (PDSCHs); and wherein
the N groups of rate matching parameters being used for indicating the rate matching resources corresponding to the N groups of physical channels comprises: the N groups of physical channels being PDSCHs scheduled by N groups of physical downlink control channels (PDCCHs), and an i-th group of rate matching parameters in the N groups of rate matching parameters being used for indicating rate matching resources corresponding to PDSCHs scheduled by an i-th group of PDCCHs in the N groups of PDCCHs,
wherein the i-th group of PDCCHs come from an i-th group of control resource sets ControlResourceSets (CORESETs), i=0, . . . , N−1, and N is an integer greater than 1.

12. The method according to claim 9, wherein the N groups of physical channels are PDCCHs; and wherein
the N groups of rate matching parameters being used for indicating the rate matching resources corresponding to the N groups of physical channels comprises: the N groups of physical channels being N groups of PDCCHs, and an i-th group of rate matching parameters in the N groups of rate matching parameters are used for indicating rate matching resources corresponding to an i-th group of PDCCHs in the N groups of PDCCHs, wherein the i-th group of PDCCHs come from an i-th group of CORESETs, i=0, . . . , N−1, and N is an integer greater than 1.

13. The method according to claim 9, wherein a same group of rate matching parameters of the N groups of rate matching parameters comprise a same rate match group indicator RateMatchGroupID, the RateMatchGroupID is an integer greater than or equal to 0 and less than N, and N is an integer greater than 1;
wherein a RateMatchGroupID of an i-th group of rate matching parameters of the N groups of rate matching parameters satisfies that the RateMatchGroupID=i, i=0, . . . , N−1, and N is an integer greater than 1.

14. The method according to claim 13, wherein the RateMatchGroupID is comprised in any one of following parameters:
a rate match pattern RateMatchPattern, a zero power channel-state information reference signal resource set (ZP CSI-RS resource Set), a non zero power channel-state information reference signal resource set (NZP CSI-RS resource Set), a non zero power channel-state information reference signal resource (NZP CSI-RS resource), non zero power channel-state information reference signal resource set configuration (NZP CSI-RS resource Set config), channel-state information report configuration (CSI reportconfig), downlink preemption DownlinkPreemption, an LTE common reference signal rate match pattern RateMatchPatternLTE-CRS or a control resource set ControlResourceSet.

15. The method according to claim 9, further comprising:
in response to the N groups of rate matching parameters comprising an lte-CRS-ToMatchAround, an i-th group of PDCCHs comprising a resource element (RE) and the RE being the same as an RE corresponding to a time-frequency resource indicated by an lte-CRS-ToMatchAround of an i-th group of rate matching parameters, not receiving or ignoring the i-th group of PDCCHs; or
in response to the rate matching parameters comprising an lte-CRS-ToMatchAround, an i-th group of PDCCHs comprising a resource element (RE) and the RE being the same as an RE corresponding to a time-frequency resource indicated by an lte-CRS-ToMatchAround of any group of rate matching parameters, not receiving or ignoring the i-th group of PDCCHs;
wherein the i-th group of PDCCHs is from an i-th group of CORESETs, i=0, . . . , N−1, and N is an integer greater than 1.

16. A rate matching apparatus, comprising:
a processor and a memory storing processor-executable instructions which, when executed by the processor, are configured to implement the method of claim 10.

* * * * *